United States Patent Office 3,433,491
Patented Mar. 18, 1969

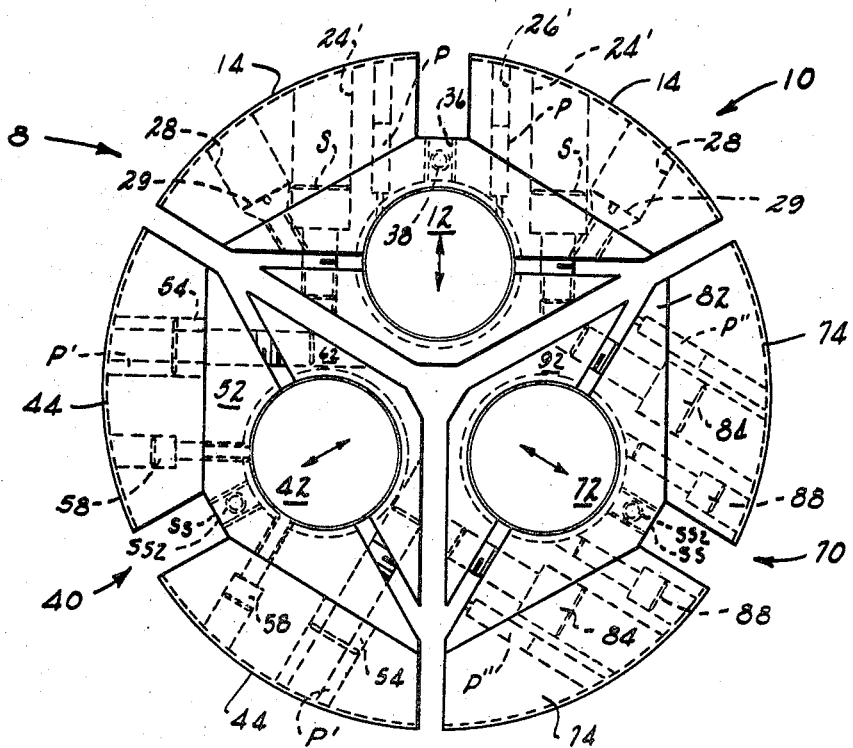
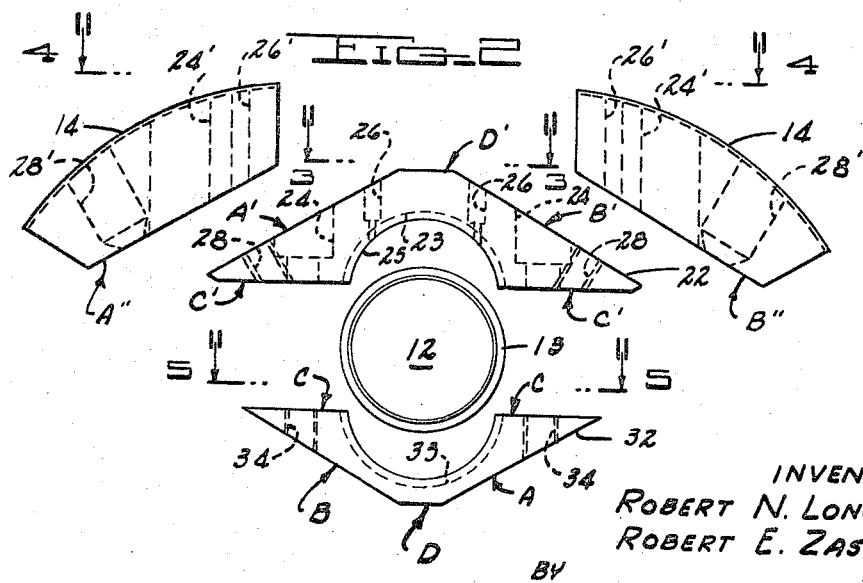

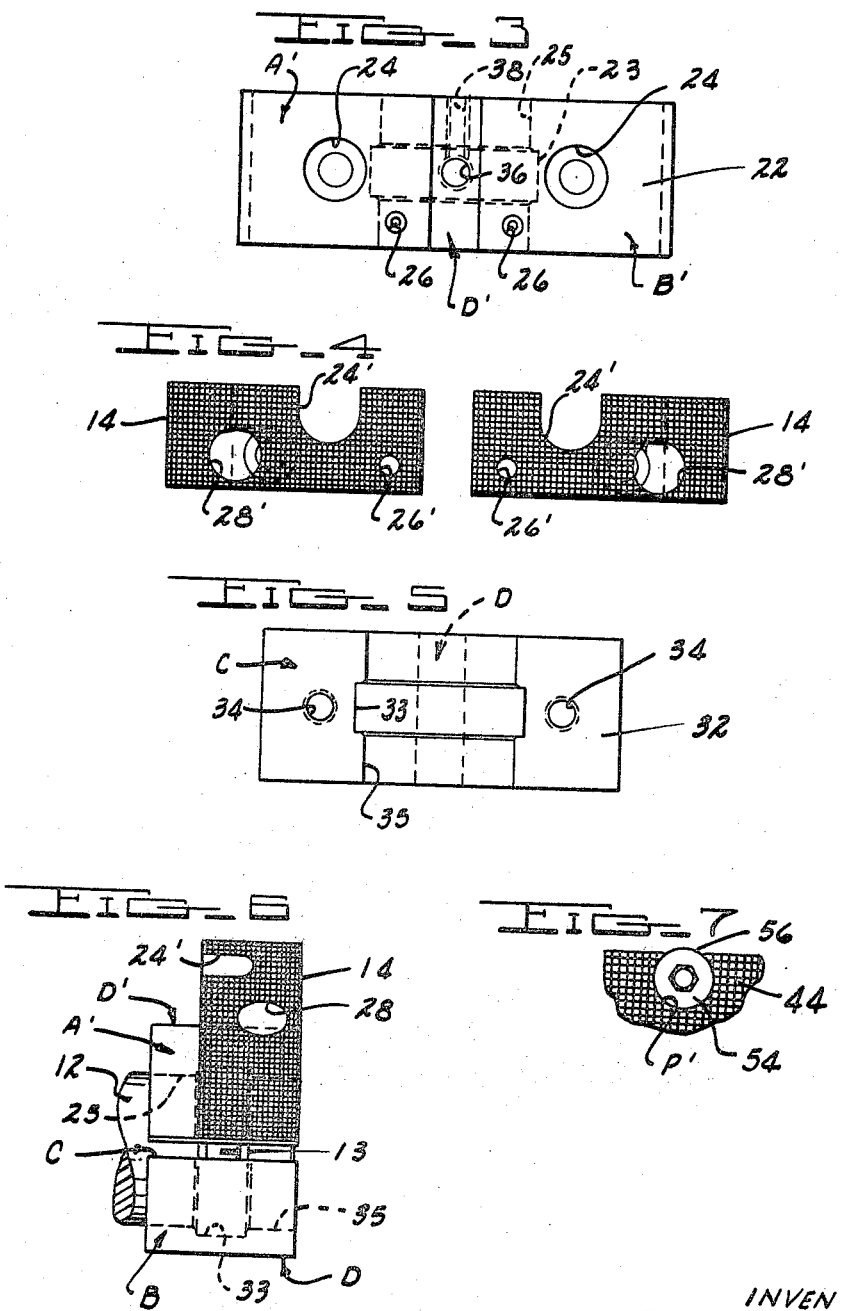

3,433,491
CHUCK JAWS
Robert N. Longuski and Robert E. Zaske, Garden City, Mich., assignors to Round Tool Co., Inc., Detroit, Mich.
Filed Mar. 1, 1966, Ser. No. 538,463
U.S. Cl. 279—2
Int. Cl. B23b 31/40, 5/34, 31/14
10 Claims

ABSTRACT OF THE DISCLOSURE

The chuck jaws about to be described are interchangeable with other similar chuck jaws, each of which can be quickly and easily put on, or removed from without complete dis-assembly of the chuck on which they are installed. This is accomplished by the provision of a chuck jaw adapter which is accurately positioned about a flange on the chuck grip or clamping member, whereafter the chuck jaws are accurately secured to one of the chuck jaw adapters, each of the grip members having chuck jaws secured thereto.

---

The present invention relates to new and useful improvements in automatically actuated machine tool chucks and particularly to a chuck having replaceable jaws which can be readily removed without complete dis-assembly of the chuck.

While an automatically actuated chuck is not one of the most recent machine tool innovations, nor is it a device which receives very much attention. However, one serious problem has been present which has resulted in the loss of much production capacity. This problem is down time. This down time occurs when the chuck is dis-assembled for changing worn or otherwise defective chuck jaws. The present invention is directed to the elimination of this problem.

It is therefore a primary object of the present invention to provide a chuck jaw assembly which is interchangeable with existing design, wherein the jaws can be replaced without the complete dis-assembly of the entire chuck.

Another object of the invention is the provision of a chuck jaw assembly which is interchangeable with existing design, wherein the replacement jaw will provide increased clamping area for better engagement with the workpiece, thus, more efficient clamping and longer life expectancy of the chuck jaw.

Still another object of this invention is the provision of a chuck jaw assembly which is not only more durable than those currently available, but less costly.

Another object of the invention is the provision of a chuck jaw in a variety of sizes which incorporate the same locating points, with the height thereof being in differing dimensions, thus a set of jaws having the same size will provide a chuck of one capacity, while a set of jaws of another size will provide a chuck of another capacity.

Still another object is the provision of a chuck jaw assembly which is simple, durable and capable of being manufactured in quantity using modern mass production methods.

The above and other objects can be accomplished by the provision of a chuck jaw assembly which is interchangeable with those currently available, said chuck jaw assembly being of generally symmetrical configuration and adapted for clamping engagement with a flanged cylindrical member which extends from the chuck proper, the two members which engage the flanged cylindrical member are each of generally symmetrical configuration with the opposing surfaces of each respective part being flat and in generally parallel relationship, said members having a substantially semi-circular undercut section for alignment of said members with said flange, which members are clamped around said cylindrical member with two screws, one on each side of the cylindrical member to form a chuck jaw supporting means, a generally symmetrical chuck jaw secured to each of the flat surfaces of one of said members, each of said chuck jaws located with a pin positioned in angular relationship to the surface on which the chuck jaw is located, with the securing screw being located in perpendicular relationship thereto, said chuck jaws having serrations on the outer surface thereof for engagement with a workpiece, said chuck jaws being replaceable without dis-assembly of the entire chuck when they become worn or otherwise defective.

Other objects of the present invention will appear in the accompanying description and appended claims, with reference to the drawings which form a part of this specification, wherein like reference characters designate corresponding parts in the several views.

In the drawings:
FIGURE 1 illustrates a tool chuck assembly wherein three forms of the present invention are illustrated.
FIGURE 2 is an exploded view of the invention which shows the essential parts of the invention.
FIGURE 3 is a view taken substantially along lines 3—3 of FIGURE 2 illustrating the upper portion of the chuck jaw support means.
FIGURE 4 is a plan view of the chuck jaws taken along lines 4—4 of FIGURE 2.
FIGURE 5 is a plan view of the lower section of the chuck jaw support means, along lines 5—5 of FIGURE 2.
FIGURE 6 is a side elevation of a single chuck jaw assembly as shown exploded in FIGURE 2.
FIGURE 7 is a partial plan view of a modified chuck jaw as shown in FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Looking now at the drawings, FIGURE 1 illustrates a tool chuck which embodies the present invention. However, three forms of the invention are illustrated in this assembly drawing.

The most common type of automatically actuated tool chuck has been a three jawed device actuated pneumatically or by a cam which displaces the members which support the chuck jaws. The chuck assembly 8 shown in FIGURE 1 has three cylindrical flanged members 12, 42 and 72 which are radially displaceable and have positioned thereon, three chuck jaw assemblies 10, 40 and 70. However, it will be understood that the differing chuck jaw assemblies illustrated herein are for purposes of illustration and that in actual usage, all of the chuck jaw assemblies will be the same.

It will be noted in FIGURE 2 that the cylindrical member 12 has a flange 13 thereon. The undercut 23 in the chuck jaw support member 22 is of the same dimension as the width of the flange, while the semi-circular portion 25 thereof is of the same dimension as the outside diameter of the cylindrical member 12. Since the flange 13 and the undercut 23 each have parallel sidewalls and thus provides a means for aligning the chuck jaw support member 22 with the cylindrical member 12. A similar undercut 33 is located in the chuck jaw clamping member 32, thus aligning each of the respective parts 22 and 32.

The chuck jaw support member 22 and the chuck jaw clamping are each of generally symmetrical configuration and when clamped together have opposed surfaces which are flat and in generally parallel relationship. Surface A of the clamping member 32 is parallel with surface A' of the chuck jaw support member 22, while surface B is parallel with surface B' on each of the respective parts. In addition, surfaces C and C' are also in parallel relationship, as are surfaces D and D' while being parallel with each other.

Two openings 24, which are counterbored, are located in parallel spaced relationship and perpendicularly to surface C' of the chuck jaw support member 22, while similar threaded openings 34 are located in alignment with said counterbored openings in said chuck jaw clamping member 32. Each of said openings being spaced from said cylindrical member 12 the same distance. Two locator openings 26 are positioned in parallel spaced relationship to each other and generally perpendicular to the plane of surface C'. The locator openings 26 are also counterbored to form a stop for the locator pin positioned therein. Two threaded openings 28 are also located in the chuck jaw support member 22 in pre-determined spaced relationship and generally perpendicular relationship to the flat surfaces A' and B' respectively. A threaded opening 36 is centrally positioned on surface D' and depends perpendicular to the plane of surface C' and D' respectively and intersects another threaded opening 38 which extends at right angles thereto and generally parallel to the cylindrical member 12. Threaded members S are used to join the chuck jaw support member to the chuck jaw clamping member 32. The assembled parts are positioned on the cylindrical member 12 by means of a set screw SS in the threaded opening 36 and retained therein by a second set screw SS2 in the threaded opening 38.

The detachable chuck jaw 14 are of generally symmetrical configuration with the under surface thereof being generally flat and adapted for engagement with flat surface A'. A slotted opening 24' is located in alignment with opening 24 in the chuck jaw support member 22 for receiving the head of screw S, while an opening 26' is provided in alignment with opening 26 for receiving a locator pin P, with still another opening 28' in alignment with opening 28 for receiving the attaching screw 29 for the chuck jaws 14. The outer surface of the chuck jaw is arcuate and has serrations on the surface thereof. Since the chuck jaws 14 can be of any thickness, the arcuate portion thereof is variable and adapted to engage the inner surface of a cylindrical member when the chuck is actuated.

From the foregoing description, it is readily apparent that the chuck jaws of the present invention can be readily removed and replaced without dis-assembly of the chuck by the removal of a single screw.

In each of the two modified forms of the invention shown in FIGURE 1, the chuck jaw support members 52 and 62 are of the same general configuration as members 22 and 32, as are members 82 and 92 respectively. The difference being in the method of attachment of the jaws 44 and 74. Jaws 44 are attached by means of a screw 58 which extends perpendicularly into the flat surface of member 52, while members 52 and 62 are clamped together by means of screw 54, the head of which has dowel surface 56 thereon which forms the pilot on which surface P' operates to position the chuck jaws 44.

In the modified chuck jaw clamp assembly 70, members 82 and 92 are joined by screws 84, while the chuck jaw 74 is located by locator pin P" and secured by screw 88. Each of the members 84, 88 and P" intersect the surfaces A" and B" in angular relationship.

From the foregoing description, it is readily noted that the invention is simple, durable and relatively inexpensive to manufacture using modern mass production methods. The chuck jaw support members and clamping members can be readily attached to the flanged cylindrical members and are independent of the chuck jaws as such, since the chuck jaws can be removed or attached at will when they become worn or otherwise defective, or in the event a change in size of the chuck is found desirable and a thicker or thinner chuck jaw is used.

Having thus described our invention, we claim:

1. In a chuck construction which incorporates clamping jaws, the combination of,
   a chuck jaw support member;
   a clamping member;
   said chuck jaw support member and said clamping member joined as an assembly by two assembly screws and supported on a round displaceable flanged member which extends from the chuck;
   and a chuck jaw detachably secured to said chuck jaw support member for engagement with a workpiece when said flanged displaceable member is actuated.

2. A device as in claim 1, wherein an undercut is provided for aligning and positioning said chuck jaw support member on said clamping members.

3. A device as in claim 1, wherein each of said chuck jaws are secured to said undercut support member with a single screw.

4. In a chuck construction which incorporates clamping jaws, the combination of,
   a chuck jaw support member;
   a clamping member;
   said chuck jaw support member and said clamping member joined as an assembly by two assembly screws and supported on a displaceable member which extends from the chuck;
   and a chuck jaw detachably secured to said chuck jaw support member for engagement with a workpiece when said displaceable member is actuated, while one of said assembly screws has a head portion which forms a locator for accurately positioning said chuck jaw.

5. In a chuck construction which incorporates clamping jaws, the combination of,
   a chuck jaw support member;
   a clamping member;
   said chuck jaw support member and said clamping member joined as an assembly by two assembly screws and supported on a displaceable member which extends from the chuck;
   and a chuck jaw detachably secured to said chuck jaw support member for engagement with a workpiece when said displaceable member is actuated, while a locator portion depends from said chuck jaw support member into said chuck jaw at one angle, while a chuck jaw attaching means depends from the chuck jaw into the support member at another angle.

6. In a multi-jaw chuck construction for use in the machine tool industry, the combination of,
   a chuck jaw support member of generally symmetrical configuration;
   a clamping member of generally symmetrical configuration;
   means on said chuck jaw support member and said clamping member for accurately positioning said members on each of a plurality of displaceable members which extend from said chuck;
   said chuck jaw support member and said clamping member joined as an independent assembly on each of said displaceable members;
   and two chuck jaws secured to each of said chuck jaw support members, each chuck jaw being secured thereto by means of a single scrwe, with keying means disposed between said chuck jaws and said chuck jaw support members for accurately positioning same, so as to permit replacement of said chuck jaws without dissassembly of the entire chuck.

7. A device as in claim 6, wherein said chuck jaw support member and said clamping members have opposed sides thereon which are located in generally parallel relationship with the surfaces thereof being generally flat.

8. A device as in claim 6, wherein each of said chuck jaws used are of generally symmetrical configuration and of opposite hands.

9. A device as in claim 6, wherein said chuck jaw support member and said clamping member are joined as an independent assembly by two screws in spaced parallel relationship, said keying means in the form of a dowel pin between the respective parts and in parallel relationship to the two assembly screws.

10. A device as in claim 6, wherein said chuck jaw support member and said clamping member are joined as an independent assembly by two screws in spaced relationship which depend perpendicularly to the surface in which they are mounted, while the single screw which secures the chuck jaw depends angularly into the mounting surface.

References Cited

UNITED STATES PATENTS

| | | | |
|---|---|---|---|
| 463,373 | 11/1891 | Skinner | 279—123 |
| 1,033,547 | 7/1912 | Cornil | 279—123 X |
| 2,421,281 | 5/1947 | McKay et al. | 279—123 X |
| 2,609,720 | 9/1952 | Barnard. | |
| 3,099,457 | 7/1963 | Hohwart et al. | 279—106 |

LESTER M. SWINGLE, *Primary Examiner.*

J. C. PETERS, *Assistant Examiner.*

U.S. Cl. X.R.

279—106, 123